Aug. 12, 1958     G. E. FORD     2,846,836
TORQUE LIMITING COUPLING
Filed July 26, 1954     4 Sheets-Sheet 1
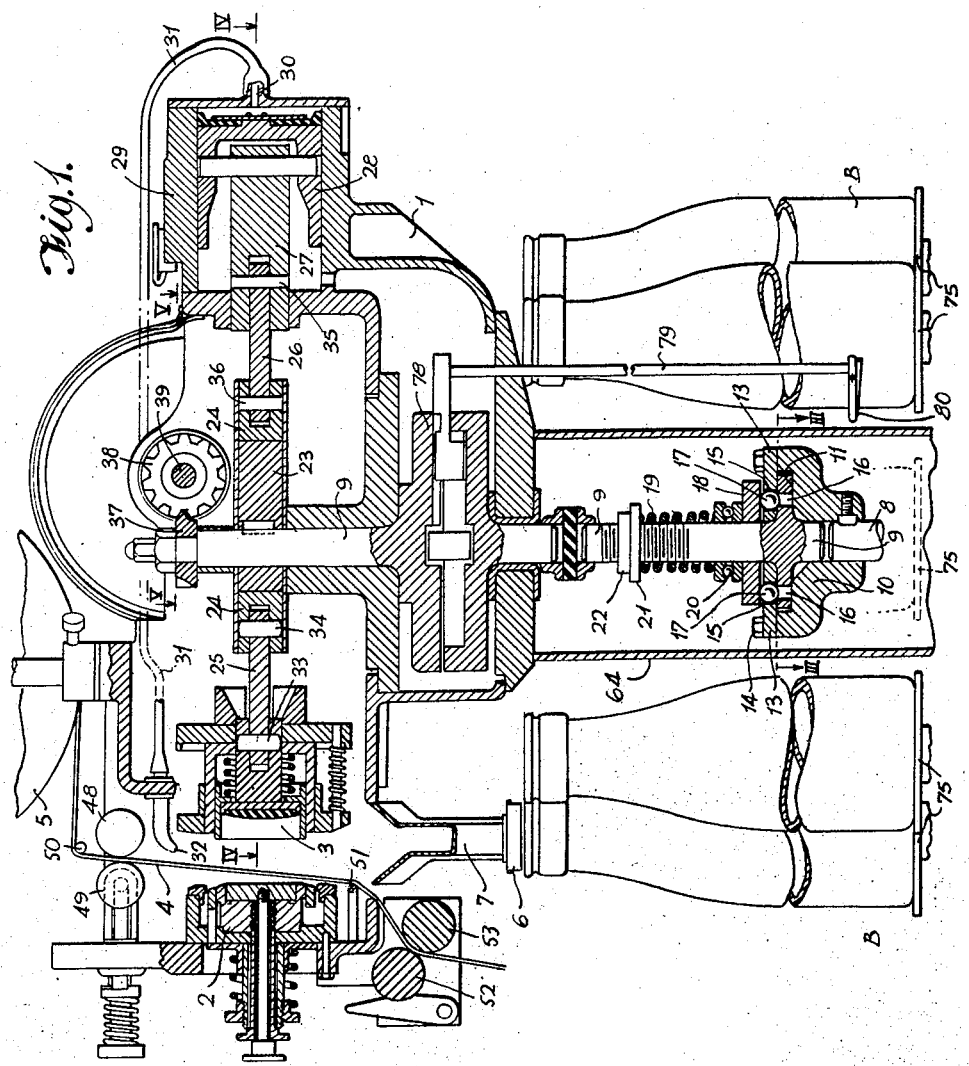
Inventor
Geoffrey Ewart Ford.
By
Attorney

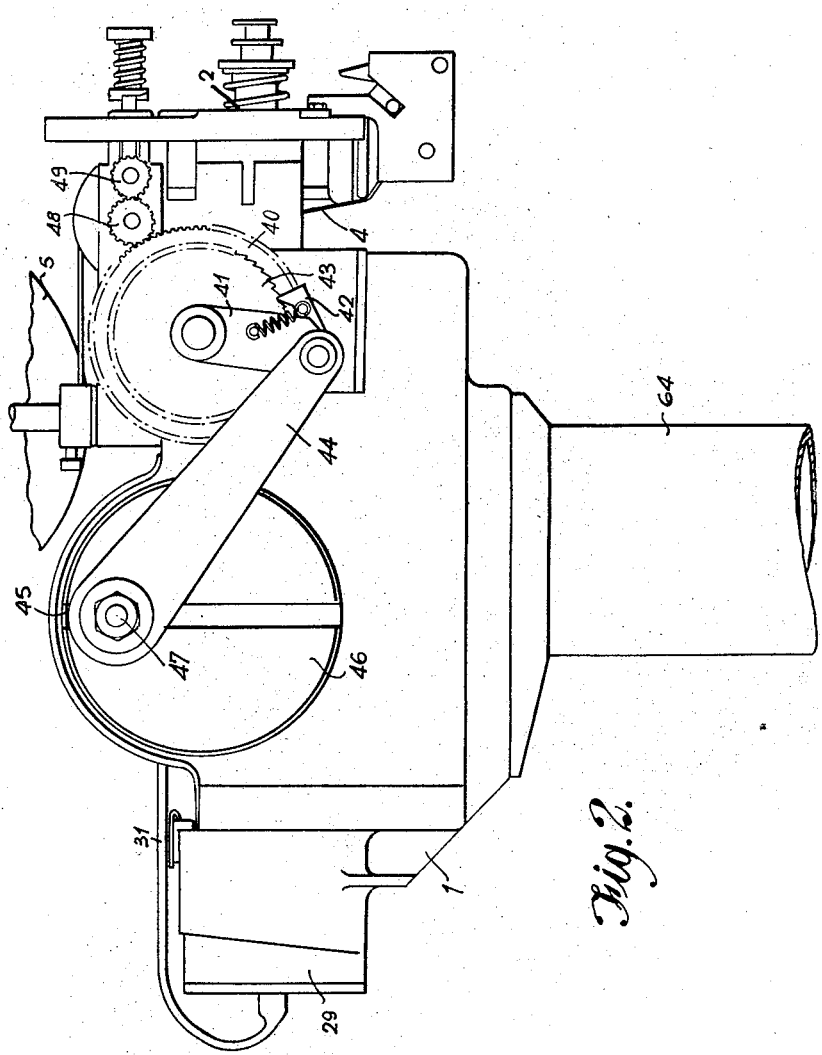

Aug. 12, 1958     G. E. FORD     2,846,836
TORQUE LIMITING COUPLING

Filed July 26, 1954     4 Sheets-Sheet 3

Inventor
Geoffrey Ewart Ford
By
Attorney

Aug. 12, 1958  G. E. FORD  2,846,836
TORQUE LIMITING COUPLING
Filed July 26, 1954  4 Sheets-Sheet 4

Inventor
Geoffrey Ewart Ford
By Gardner & O'Boyle
Attorney

United States Patent Office 2,846,836
Patented Aug. 12, 1958

2,846,836

TORQUE LIMITING COUPLING

Geoffrey Ewart Ford, Bedford, England, assignor to Fords (Finsbury) Limited, Bedford, England, a British company Application July 26, 1954, Serial No. 445,639

Claims priority, application Great Britain July 28, 1953

13 Claims. (Cl. 53—296)

The present invention relates to a torque limiting coupling which enables the torque applied to a rotatable driven member from a rotating driving member to be limited to a predetermined value, the coupling releasing when the torque exceeds this value. The coupling according to this invention automatically re-engages to re-connect the drive at each revolution of the driving member so that the drive will again be established when the torque falls below the predetermined value, the coupling continuing to release at each revolution so long as the torque is excessive.

The torque limiting coupling according to the present invention comprises two disc-like members arranged face to face, the first of the members having apertures extending therethrough at spaced points around its axis, said apertures containing locating balls having a diameter larger than the thickness of the said first disc member so that portions of the balls will project from opposite surfaces thereof, the adjacent second disc member being provided with apertures or recesses at positions corresponding to the positions of the balls and into which the portions of the balls projecting from the adjacent side of the first disc member extend for a short distance a spring-pressed collar or member bearing on the balls where they project from the opposite side of the first disc member and urging them into engagement with the apertures in the second disc member. The balls thus normally connect the two disc members to effect the drive, but upon an increase of torque the balls are moved in their apertures against the action of the spring-passed member and thereby allow one disc to rotate relative to the other.

The balls and locating apertures are preferably so arranged that the driving and driven members will only be engaged at one single relative position of the two members. A feature of the invention consists in arranging the balls in such a manner that any tendency to transverse deflection of the coupling, when the coupling releases, is compensated.

The torque limiting coupling according to the present invention is of general application but according to a feature of the invention it is applied in the drive to a machine for making bottle caps, for example, from aluminium foil.

In order that the invention may be more clearly understood, reference will now be made to the accompanying drawings which show the invention applied by way of example, to a machine for making bottle caps from aluminium foil, and in which:

Fig. 1 is a view of the machine from one side, mainly in section.

Fig. 2 is a view of the opposite side.

Figure 4:
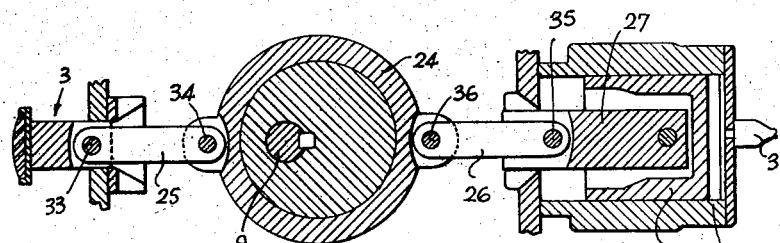
Fig. 4 is a plan along the line IV—IV of Fig. 1.

In Figs. 1 to 5 of the drawings, a casing 1 is arranged to accommodate a punch 2 and a die 3 for punching out bottle caps from aluminium foil 4, which is fed between the punch and the die from a spool partly shown at 5, so that a punching action may be effected on the foil to form a continuous stream of caps (one of which is shown at 6) to issue from the machine down a chute 7.

The punch 2 is normally held stationary in the machine, and the die 3 is moved towards it to effect punching of the caps 6 and the movement is derived from a main drive shaft 8 powered from a convenient source for example, from the power source of a bottle-filling machine in conjunction with which the capping apparatus may be used. Such drive and combination with the filling machine is not shown in Figs. 1 to 5, as it would unnecessarily complicate them, but a schematic showing of the arrangement will be described later in conjunction with Fig. 6.

The main drive shaft 8 is coupled to a driven shaft 9 by means of the torque-limiting coupling according to the invention. The main drive shaft 8 carries at its end a housing 10 formed with a hollow cylindrical recess 11. When this recess fits a disc-like flange 12 secured on the driven shaft 9, the flange being retained in the recess by a disc-like driving plate 13 secured by bolts 14 over the open end of the housing 10.

The driving plate 13 is provided around its axis with a plurality of transverse apertures 15 of a diameter greater than the thickness of the driving plate 13 and the flange 12 is formed with a similarly disposed series of apertures 16 of smaller diameter than the apertures 15. Within the apertures 15 are located hardened balls 17 of a diameter which will fit freely within the apertures 15 but which are larger than the diameter of the apertures 16 so that the balls will normally rest as shown with a part of the periphery extending into the apertures 16. The diametrically opposite parts of the peripheries of the balls 17 project beyond the opposite face of the driving plate 13 where they are engaged by a collar 18 urged by a spring 19 towards the driving plate 13 and thus tightened to urge the balls 17 into the apertures 16. A thrust ball race 20 is located between the collar 18 and the adjacent end of the spring 19, the compression of the spring 19 being adjusted by a nut 21 screwed on to the driven shaft 9, the nut 21 being secured in position by a lock nut 22.

The apertures 15 are disposed around the axis of the driving plate 13 in such a manner that they will become aligned with the apertures 16 in the flange 12 at only one predetermined relative position of these two members. Thus, when the torque transmitted by the coupling extends a predetermined value, the balls 17 will ride out of the apertures 16 thereby forcing the collar 18 against the action of the spring 19, the balls being held disengaged until the housing 10 has made one complete revolution relative to the flange 12 when the balls will again be urged into the apertures 16. They will again immediately release if the torque still exceeds the predetermined value which may be adjusted by varying the tension of the spring 19 but will reconnect the drive if the torque to be transmitted has fallen.

Figure 3:
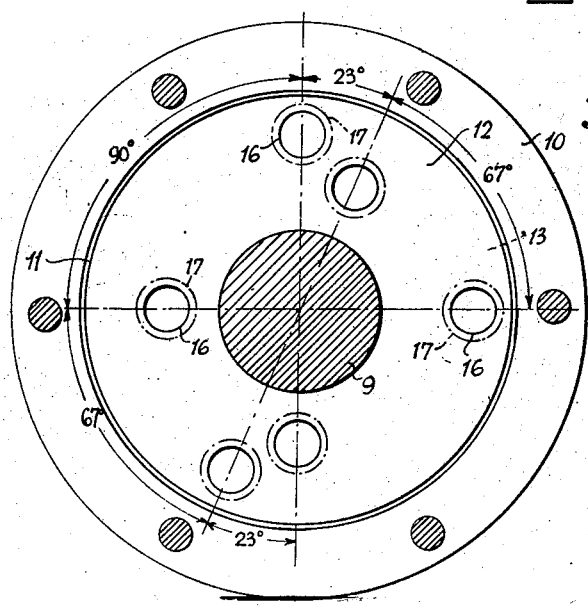
Fig. 3 is a plan along the line III—III of Fig. 1, but to an enlarged scale.

As shown in Fig. 3, the balls 17 are arranged to lie on at least two circles of different diameters around the axis of the driving plate 13, the balls on one circle being located diametrically opposite the balls arranged on the other circle whereby when the coupling releases there will always be two diametrically opposite balls resting on the plain parts of the flange 12 whilst other balls are moving past the apertures 16 whence the collar 18 will be moved with a parallel action against the spring 19 and there will be no tendency for the collar to tilt relatively to the axis of the coupling.

The driven shaft 9 is arranged to reciprocate the die 3 by means of an eccentric arrangement shown more particularly in Fig. 4. A disc 23 is eccentrically secured to the shaft 9 and a sheath 24 is a sliding fit over said disc 23. From the sheath 24 project two links 25 and 26 which are coupled respectively to the die 3 and to a piston rod 27 whose piston 28 is reciprocable within a cylinder 29 of an air pump, the outlet 30 of which is connected by tubing 31 to a nozzle 32 arranged directly above the press tools, the pump piston movement being so timed as to cause a blast of air to be ejected from the nozzle 32 as the tools are opening thereby to blow a formed cap 6 from the surface of the die 3 and into the chute 7. If desired, means may be provided for adjusting the position of the nozzle but this is not shown in the drawings.

To effect the movements of the die and the piston rod the link 25 is connected to the die 3 and sheath 24 by pivot pins 33 and 34 respectively and the link 26 is connected to the piston rod and sheath 24 by pivot pins 35 and 36 respectively.

Thus it will be seen that rotation of the driven shaft 9 rotates the eccentric 23 as a result of which the links 25 and 26 effect an alternate reciprocating movement of the die 3 and the piston 28.

In order to advance the foil 4, the driven shaft 9 carries at its upper end a skew gear 37 which mates with a cooperating skew gear 38 on a transversely arranged shaft 39 which is arranged to drive intermittently a gear-wheel 40 via a reciprocating arm 41 provided with a latch 42 which engages with the teeth of a ratchet wheel 43 fixed to the gear-wheel 40 during the reverse movement of the arm 41 when the die 3 is being moved away from the punch 2. The reciprocating arm 41 is actuated by a crank member 44 adjustably clamped in a slot 45 in a timing disc 46 mounted outside the casing 1 on the shaft 39 which projects through suitable bearings in said casing. The crank 44 is adjusted in position in slot 45 by nut 47. The adjustment will be such that the foil 4 commences to advance as soon as the tools 2 and 3 commence to open.

The gear-wheel 40 drives a pair of feed rollers 48 and 49 between which the foil 4 is conveyed over the guiding peg 50 between the tools 2 and 3, guiding peg 51 and between outer feed rollers 52 and 53.

Figure 5:
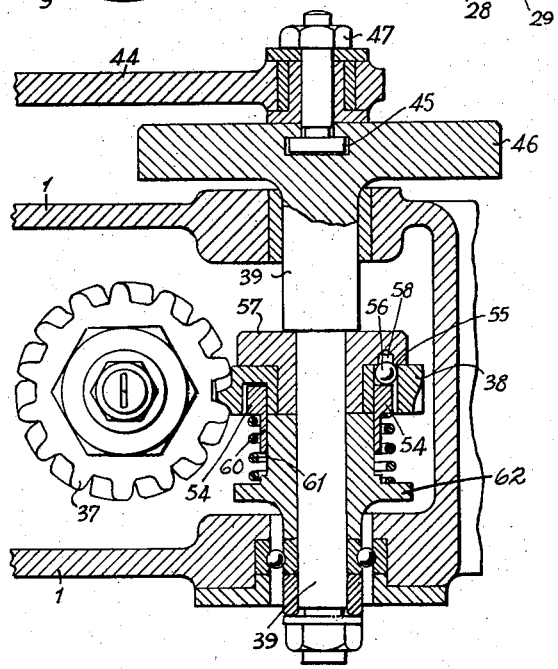
Fig. 5 is a plan along the line V—V of Fig. 1, but to an enlarged scale.

A further torque limiting coupling according to the invention is also incorporated in the shaft 39, as shown more particularly in Fig. 5. The gear 38 has a groove in the base of which is a plurality of apertures 55 locating balls 56, the gear 38 being located round a collar 57 keyed to shaft 39. This collar 57 also has a number of apertures 58 into which the balls 56 protrude. The gear 38 is thus analogous to the driving plate 13, of Fig. 1 and the collar to flange 12. The collar 18 of Fig. 1 is replaced by the collar 54 which has an extension 60 around which coil spring 61 is located. The spring is retained by collar 62 keyed to shaft 39. In operation the coupling works in a manner similar to that of the arrangement of Fig. 1. Thus, when the torque transmitted by the coupling exceeds a predetermined value, the balls 56 will ride out of the apertures 58, thereby forcing the collar 54 against the action of the spring 61, the balls being held disengaged until the gear 38 has made one complete revolution relative to the collar 57 when the balls will again be urged into the apertures 58, if and when the torque is at the correct predetermined value, as previously explained.

Figure 6:
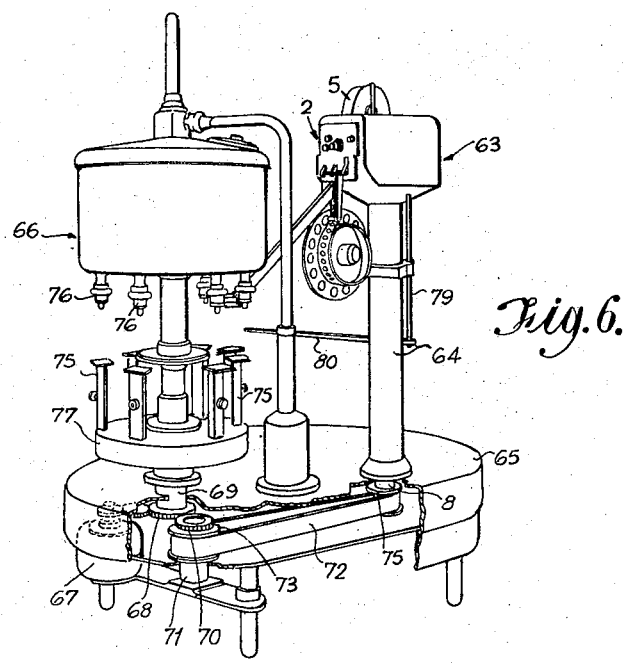
Fig. 6 shows a cap-making machine in cooperation with a bottle-filling machine.

As referred to above, the cap-making machine shown in Figs. 1 to 5 may be driven from a bottle-filling machine and such an arrangement is shown in Fig. 6. In this figure the cap-making machine is indicated generally by the arrow at 63 standing upon a pedestal 64 which encloses the shafts 8 and 9 referred to in the prior figures.

The pedestal 64 is mounted upon a platform 65 upon which a bottle-filling machine, generally indicated by the arrow at 66, is also mounted. The platform 65 covers a source of power shown schematically as a motor 67, which is arranged to drive the filling machine via gear 68 and shaft 69, as shown, and the gear 68 is also coupled to a pinion 70 on a shaft 71 located in suitable bearings in the platform 65 to enable the drive shaft 8 of the cap-making machine to be driven by means of a suitable drive member schematically shown as a belt 72 mounted on a pulley 73 on the shaft 71, the belt 72 passing round another pulley 74 on the drive shaft 8.

The filling machine has a number of supports 75 adapted to support bottles for filling beneath filling nozzles 76, the support 75 being mounted on a rotatable wheel 77 to pass bottles to the capping station at the end of the chute 7.

In order to prevent too many caps being made, the bottles are caused to operate a clutch within the capping machine so that the driven shaft 9 only rotates the gear 37 whilst filled bottles are proceeding from the filling machine.

A clutch is shown schematically at 78 in Figure 1, operated by a rotary rod 79 at the lower end of which is an operating arm 80 contacted by the bottles B in their passage to or around the filling machine. Whilst there is a continuous stream of bottles proceeding round the machine, the clutch arm 80 will be urged in a forward direction so as to keep the clutch 78 in to enable the press to be continuously operated but as soon as a gap in the bottles B occurs, the arm 80 will swing backwards against a biassing spring or the like to throw the clutch 78 out and stop the press.

Inasmuch as the physical position of the filling and capping machine may vary within wide limits, it will be appreciated that the clutch-operating members 79 and 80 are only depicted schematically and that various modifications could be made, as desired, to the specific details shown.

In the combination described, the torque-limiting coupling according to the invention is particularly useful because the power source required to drive the filling machine 63 is large. If the press were to become jammed owing to a fault, and no torque limitation were present, the power source of the filling machine would still force the press to work even though jammed and would possibly cause extensive damage. However, in the event of trouble in the press, the torque-limiting device would cause an automatic disconnection of the press from the drive power and avoid such possible extensive damage. The limiting device in the shaft 39 may be much smaller than that between shafts 8 and 9 because it only has to accommodate the relatively light load of the coil feed.

I claim:

1. A torque-limiting coupling comprising a drive shaft and a driven shaft axially separated, a housing containing a recess at the end of said drive shaft, a disc-like member projecting radially near one end of said driven shaft and fitting into said recess, a plate member secured over the open mouth of said recess and of such dimensions as to cover said disc-like member and to surround said driven shaft behind said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, a spring member surrounding said driven shaft and acting on said collar to press said balls towards said apertures in said disc-like member, and means for securing the other end of said spring with relation to said driven shaft.

2. A torque-limiting coupling comprising a drive shaft and a driven shaft axially separated, a housing containing a recess at the end of said drive shaft, a disc-like member near one end of said driven shaft and fitting into said recess, a plate member secured over the open mouth of said recess and of such dimensions as to cover said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, a spring surrounding said driven shaft one end of said spring acting on said collar to press said balls towards said apertures in said disc-like member, a screw thread on said driven shaft spaced from said disc-like member and an adjusting nut and lock nut on said thread, the other end of said spring being in contact with said adjusting nut which forms a limit stop therefor.

3. A torque-limiting coupling comprising a drive shaft and a driven shaft axially separated, a housing containing a recess at the end of said drive shaft, a disc-like member near one end of said driven shaft and fitting into said recess, a plate member secured over the open mouth of said recess and of such dimensions as to cover said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, a spring surrounding said driven shaft, a thrust race between one end of said spring and said collar, said spring and thrust race acting on said collar to press said balls towards said apertures in said disc-like projection, and means for securing the other end of said spring with relation to said driven shaft.

4. A bottle-capping machine incorporating press tools for forming caps for metal foil passed through the machine, a drive shaft for said machine, a driven shaft in said machine, connection means between said driven shaft and said tools, a further shaft operable to feed foil to said press tools, a driving connection between said driven shaft and said further shaft, a torque-limiting coupling between said drive shaft and said driven shaft, and a torque-limiting coupling included in said further shaft, each of said torque-limiting couplings comprising two disc-like members arranged face to face, apertures in the first of said members extending therethrough at spaced points around its axis, locating balls in said apertures, said balls having a diameter larger than the thickness of said first member so that portions of the balls will project from opposite faces thereof, apertures in said second disc-like member, the apertures in said second member corresponding to the positions of the balls projecting from said first member and into which the portions of the balls projecting from the adjacent face of said first member extend for a short distance, a collar member bearing on said balls where they project from the opposite side of said first disc-like member and separate spring means operating on said collar member for urging said collar member into engagement with said balls to urge said balls, in turn, into the said apertures in said second disc member when the apertures in said disc-like members are in register.

5. A bottle-capping machine incorporating press tools for forming caps from metal foil passed through the machine, a drive shaft for said machine, a driven shaft in said machine axially separated from said drive shaft, connection means between said driven shaft and said tools, and a torque-limiting coupling between said drive shaft and said driven shaft, said torque limiting coupling comprising a housing containing a recess at the end of said drive shaft, a disc-like member projecting radially near one end of said driven shaft and fitting into said recess, a plate member secured over the open mouth of said recess and of such dimensions as to cover said disc-like member and to surround said driven shaft behind said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, a spring member surrounding said driven shaft and acting on said collar to press said balls towards said apertures in said disc-like member, and means for securing the other end of said spring with relation to said driven shaft.

6. A machine as claimed in claim 7, in which said driven shaft drives a further shaft operable to feed foil to said press tools, said further shaft including a torque limiting coupling comprising two disc-like members arranged face to face, apertures in the first of said members extending therethrough at spaced points around its axis, locating balls in said apertures, said balls having a diameter larger than the thickness of said first member so that portions of the balls will project from opposite faces thereof, apertures in said second disc-like member, the apertures in said second member corresponding to the positions of the balls projecting from said first member and into which the portions of the balls projecting from the adjacent face of said first member extend for a short distance, a collar member bearing on said balls where they project from the opposite side of said first disc-like member, and spring means for urging said collar member into engagement with said balls to urge said balls, in turn, into the said apertures in said second disc member when the apertures in said disc-like members are in register.

7. A bottle-capping machine incorporating press tools for forming caps from metal foil passed through the machine, a drive shaft for said machine, a driven shaft in said machine and axially separated from said drive shaft, connection means between said driven shaft and said tools, and a torque limiting coupling between said drive shaft and said driven shaft, said torque limiting coupling comprising a housing containing a recess at the end of said drive shaft, a disc-like member near one end of said driven shaft and fitting into said recess, a plate member secured over the open mouth of said recess and of such dimensions as to cover said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said drifen shaft and in contact with said balls, a spring surrounding said driven shaft one end of said spring acting on said collar to press said balls towards said apertures in said disc-like member, a screw thread on said driven shaft spaced from said disc-like member and an adjusting nut and lock nut on said thread, the other end of said spring being in contact with said adjusting nut which forms a limit stop therefor.

8. A bottle-capping machine incorporating press tools for forming caps from metal foil passed through the machine, a drive shaft for said machine, a driven shaft in said machine and axially separated from said drive shaft, connection means between said driven shaft and said tools, and a torque limiting coupling between said drive shaft and said driven shaft, said torque limiting coupling comprising a housing containing a recess at the end of said drive shaft, a disc-like member near one end of said driven shaft and fitting into said recess, a plate member secured over the open mouth of said recess and of such dimensions as to cover said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, a spring surrounding said driven shaft, a thrust race between one end of said spring and said collar, said spring and thrust race acting on said collar to press said balls towards said apertures in said disc-like projection, and means for securing the other end of said spring with relation to said driven shaft.

9. A machine as claimed in claim 8, in which said driven shaft drives a further shaft operable to feed foil to said press tools, said further shaft including a torque limiting coupling comprising two disc-like members arranged face to face, apertures in the first of said members extending therethrough at spaced points around its axis, locating balls in said apertures, said balls having a diameter larger than the thickness of said first member so that portions of the balls will project from opposite faces thereof, apertures in said second disc-like member, the apertures in said second member corresponding to the positions of the balls projecting from said first member and into which the portions of the balls projecting from the adjacent face of said first member extending for a short distance, a collar member bearing on said balls where they project from the opposite side of said first disc-like member, and spring means for urging said collar member into engagement with said balls to urge said balls, in turn, into the said apertures in said second disc member when the apertures in said disc-like members are in register.

10. In combination a bottle-filling machine, a bottle-capping machine, a power source for driving said filling machine, means for driving a drive shaft of said capping machine from said filling machine, a driven shaft in said capping machine connected to drive press tools in said capping machine, and a torque limiting coupling between said drive shaft and said driven shaft, said torque limiting coupling comprising two disc-like members arranged face to face, apertures in the first of said members extending therethrough at spaced points around its axis, locating balls in said apertures, said balls having a diameter larger than the thickness of said first member so that portions of the balls will project from opposite faces thereof, apertures in said second disc-like member, the apertures in said second member corresponding to the positions of the balls projecting from said first member and into which the portions of the balls projecting from the adjacent face of said first member extend for a short distance, a collar member bearing on said balls where they project from the opposite side of said first disc-like member, and spring means for urging said collar member into engagement with said balls to urge said balls, in turn, into the said apertures in said second disc member when the apertures in said disc-like members are in register.

11. In combination a bottle-filling machine, a bottle-capping machine, a power source for driving said filling machine, means for driving a drive shaft of said capping machine from said filling machine, a driven shaft in said capping machine connected to drive press tools in said capping machine, and a torque limiting coupling between said drive shaft and said driven shaft, said torque limiting coupling comprising a housing containing a recess at the end of said drive shaft, a disc-like member projecting radially near one end of said driven shaft and fitting into said recess, a plate member secured over the open mouth of said recess and of such dimensions as to cover said disc-like member and to surround said driven shaft behind said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, as springs member surrounding said driven shaft and acting on said collar to press said balls towards said apertures in said disc-like member, and means for securing the other end of said spring with relation to said driven shaft.

12. In combination a bottle-filling machine, a bottle-capping machine, a power source for driving said filling machine, means for driving a drive shaft of said capping machine from said filling machine, a driven shaft in said capping machine connected to drive press tools in said capping machine, and a torque limiting coupling between said drive shaft and said driven shaft, said torque limiting coupling comprising a housing containing a recess at the end of said drive shaft, a disc-like member near one end of said driven shaft and fitting into said recess, a plate member secured over the open mouth of said recess and of such dimensions as to cover said disc-like member, apertures in said plate member, balls in said apertures of a diameter greater than the thickness of said plate member so that said balls project from either face of said plate member, apertures in said disc-like member, said apertures in said disc-like member corresponding with the apertures in said plate member, a collar located loosely around said driven shaft and in contact with said balls, a spring surrounding said driven shaft, a thrust race between one end of said spring and said collar, said spring and thrust race acting on said collar to press said balls towards said apertures in said disc-like projection, and means for securing the other end of said spring with relation to said driven shaft.

13. A torque-limiting coupling comprising two disc-like members arranged face to face, apertures in the first of said members extending therethrough at spaced points around its axis, locating balls in said apertures, said balls having a diameter larger than the thickness of said first member so that portions of the balls will project from opposite faces thereof, apertures in said second disc-like member, the apertures in said second member corresponding to the positions of the balls projecting from said first member and into which the portions of the balls projecting from the adjacent face of said first member extend for a short distance, said balls being located to lie on at least two circles of different diameters around the axis of the said first member, the balls on one circle being located diametrically opposite the balls arranged on the other circle, a collar member bearing on said balls where they project from the opposite side of said first disc-like member, and spring means for urging said collar member into engagement with said balls to urge said balls, in turn, into the said apertures in said second disc member when the apertures in said disc-like members are in register.

References Cited in the file of this patent

UNITED STATES PATENTS

| | | |
|---|---|---|
| 1,883,164 | Vassakos | Oct. 18, 1932 |
| 2,096,346 | Sharp et al. | Oct. 19, 1937 |